(12) United States Patent
Sayyah et al.

(10) Patent No.: US 7,345,804 B1
(45) Date of Patent: Mar. 18, 2008

(54) DYNAMIC OPTICAL TAG COMMUNICATOR AND SYSTEM USING CORNER CUBE MODULATING RETROREFLECTOR

(75) Inventors: Keyvan Sayyah, Santa Monica, CA (US); David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 88 days.

(21) Appl. No.: 11/471,245

(22) Filed: Jun. 19, 2006

(51) Int. Cl.
*G02F 1/03* (2006.01)
*G02B 5/122* (2006.01)
(52) U.S. Cl. ...................... 359/248; 359/529
(58) Field of Classification Search ................ 359/248, 359/245, 288, 212, 213, 216, 223, 224, 290, 359/291, 169, 170, 180, 181, 209, 211, 529, 359/515, 530, 546, 554, 834, 848, 850
See application file for complete search history.

(56) References Cited

U.S. PATENT DOCUMENTS

| | | | |
|---|---|---|---|
| 5,946,135 A * | 8/1999 | Auerswald et al. ......... 359/529 |
| 6,154,299 A | 11/2000 | Gilbreath et al. |
| 6,275,324 B1 | 8/2001 | Sneh |
| 6,525,880 B2 | 2/2003 | Flanders et al. |
| 6,594,059 B2 | 7/2003 | Flanders |
| 6,902,279 B2 * | 6/2005 | Lyons, III ................... 359/529 |
| 7,101,053 B2 * | 9/2006 | Parker ........................ 359/529 |
| 2004/0075880 A1 | 4/2004 | Pepper et al. |
| 2004/0130769 A1 | 7/2004 | Sayyah et al. |

OTHER PUBLICATIONS

G.C. Gilbreath, et al., Large-aperture multiple quantum well modulating retoreflector for free-space optical data transfer on unmanned aerial vehicles, 2001 Society of Photo-Optical Instrumentation Engineers, Opt. Eng. 40 (7) 1348-1356 Jul. 2001.

I.J. Fritz, et al., Low-voltage verticle-cavity transmission modulator for 1.06 um, 1993 American Institute of Physics, Appl. Phys.Lett. 63 (4), Jul. 26, 1993 494-496.

* cited by examiner

*Primary Examiner*—Ricky Mack
*Assistant Examiner*—Tuyen Tra
(74) *Attorney, Agent, or Firm*—Balzan IP Law

(57) ABSTRACT

In some embodiments, a dynamic optical tag communication system is provided which includes high and low index CCR, both having a modulator, such as TCFP-MQWs on a first side of the CCR configured to modulate in a first temperature range, and a modulator on a second side of the CCR to modulate in a second temperature range. In some embodiments another high index CCR having corresponding first and second temperature range modulators is provided. In some embodiments, a CCR may have three modulators, such as MQWs, one configured to modulate in a first temperature range, another to modulate in a second temperature range, and yet another to modulate in a third temperature range. In some embodiments, a dynamic optical tag communication system has CCRs which include a high index CCR having a DDG modulator and a low index CCR having a DDG modulator.

16 Claims, 5 Drawing Sheets

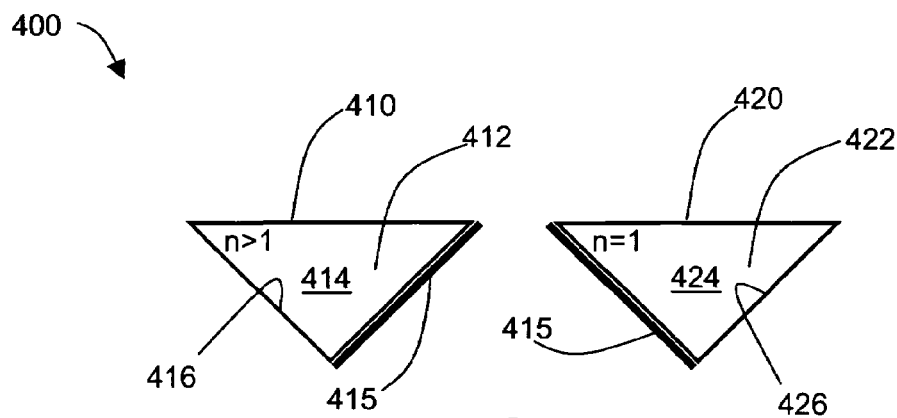
FIG. 4
FIG. 5A
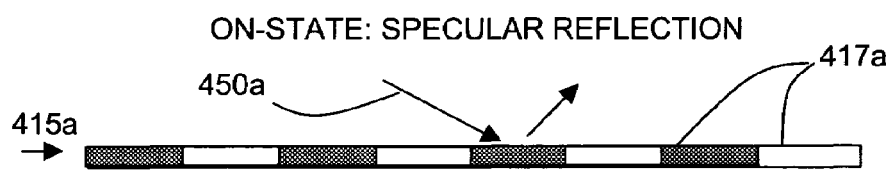
FIG. 5B
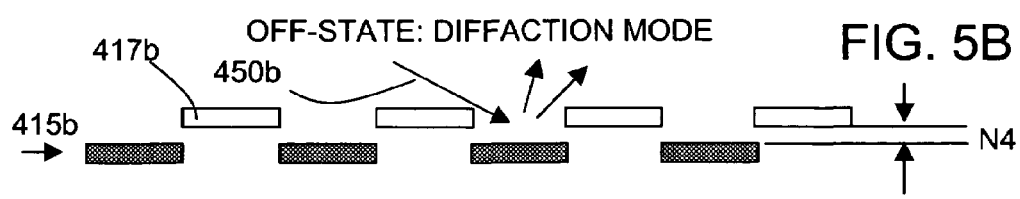

DYNAMIC OPTICAL TAG COMMUNICATOR AND SYSTEM USING CORNER CUBE MODULATING RETROREFLECTOR

BACKGROUND

A modulating retroreflector or MRR that can function as a dynamic optical tag includes a corner cube retroreflector or CCR, and a multiple quantum well or MQW modulator. Optical modulation using MQWs has, thus far, been the primary switching scheme used for retromodulators in a common (air-filled) CCR configuration. The primary advantage of this modulation scheme is its fast switching speeds, which can be well above 10 Mb/s, depending on the modulator size. Thus, the state of the art modulating retro-reflector has an air-filled hollow corner cube with a MQW modulator chip. For example see U.S. Pat. No. 6,154,299, by Gilbreath et al., entitled MODULATING RETROREFLECTOR USING MULTIPLE QUANTUM WELL TECHNOLOGY, issued Nov. 28, 2000; herein incorporated by reference. Because the modulating retro-reflector has a limited field-of-view, many modulating retro-reflectors are placed in a hemispherical array to cover a broader field-of-view.

MQW modulators have a limited temperature range of operation at a fixed wavelength due to the red shift of the exciton energy with temperature. This results in further degradation in the already limited (−2:1) contrast ratios available in these modulators. Moreover, the standard (air-filled) CCRs have limited field-of-view (typically <+/−30°), resulting in a limited acceptance angle for the DOT device.

Another potential optical modulation mechanism for the DOT device is through the use of optical MEMs switches. These small-size devices use their mechanical motion to change the direction or the phase of an incident optical beam. These devices are currently being extensively investigated for adaptive optics applications for which spatial light modulators using optical MEMs pixels are used to correct the distorted phase front of an optical beam.

In one implementation, the retromodulator is an optical MEMs mini corner-cube retroreflector (CCR), in which one of CCR surfaces is dynamically tilted to deflect the light beam out of the retro path, and beyond the device diffraction-limited angle, thus, resulting in amplitude modulation. The issues with using this approach are the switching speed of the modulator, currently in the 40-50 kHz range, and the small (300-400 micrometers) size of the CCRs that can result in loss of optical efficiency due to diffraction. The slow response time is due to the relatively large size of the switching corner-cube MEMs surface (300-400 micrometers), compared to more conventional optical MEMs dimensions. Reducing the corner-cube dimensions to improve the modulation speed results in further optical efficiency loss due to diffraction.

What is needed is a compact retroreflecting dynamic optical tag device with high performance characteristics, such as high data rate, high modulation contrast ratio, high field-of-view, and an extended temperature range of operation.

SUMMARY

In some embodiments, a dynamic optical tag communication system is provided which includes high and low index corner cube retroreflectors both having a modulator on a first side of the corner cube configured to modulate in a first temperature range, and a modulator on a second side of the corner cube configured to modulate in a second temperature range. Further included in some embodiments is another high index corner cube retroreflector having corresponding first and second temperature range modulators. In this embodiment, Fabry-Perot MQW modulators may be used if desired, which can provide enhanced device performance in some embodiments.

In some embodiments, a dynamic optical tag communication system is provided which includes a high index corner cube retroreflector having a first side comprising a modulator configured to modulate in a first temperature range, a second side comprising a modulator configured to modulate in a second temperature range, and a third side comprising a modulator configured to modulate in a third temperature range. Conventional MQW modulators may be used in this embodiment, if desired.

In some embodiments, a dynamic optical tag communication system is provided which includes a high index corner cube retroreflector also having a dynamic diffraction grating modulator and a low index corner cube retroreflector having a dynamic diffraction grating modulator.

BRIEF DESCRIPTION OF THE DRAWINGS

The features and advantages of the present invention will be better understood with regard to the following description, appended claims, and accompanying drawings where:

FIG. 4 shows a cut away side view illustrating one possible embodiment of a dynamic optical tag device.

FIGS. 5A and 5B are side views of simplified illustration of the modulation mechanism of a dynamic phase diffraction grating.

DESCRIPTION

In various embodiments discussed below, dynamic optical tag or DOT device architectures are shown. In some embodiments, combinations of high and low index corner-cube retroreflectors or CCRs, with multiple quantum well or MQW modulators, and/or dynamic diffraction grating or DDG based modulators are provided. In some MQW modulator embodiments, high contrast MQWs are provided, such as a tunable cavity asymmetric Fabry-Perot MQW or TCFP-MQW. In some MQW embodiments, the MQW modulators include conventional MQW modulators. In yet other embodiments, MEMs based DDG modulators may be utilized.

Example DOT Using High and Low Index CCRs

FIG. 1

Figure 1:
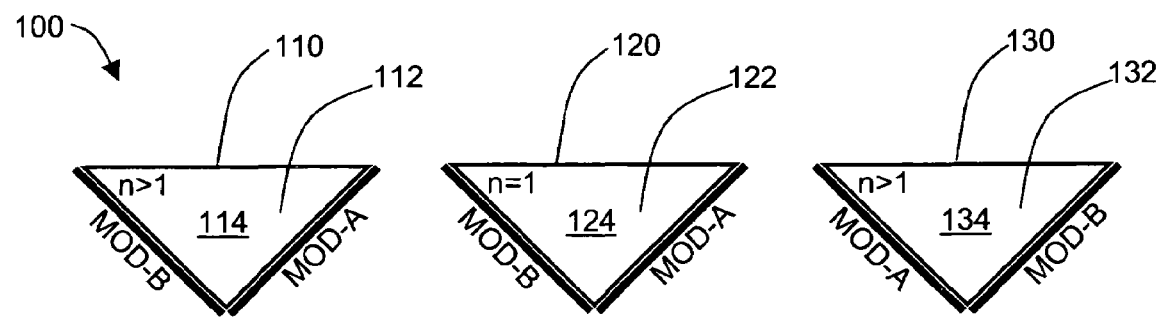
FIG. 1 shows a cut away side view illustrating one possible embodiment of a MQW modulator-based dynamic optical tag device.

FIG. 1 shows a cut away side view illustrating one possible embodiment of a MQW modulator-based DOT device 100 in accordance with the present invention. In the embodiment of FIG. 1, two different MQW modulators, MOD-A and MOD-B, are optimized for different portions of the operational temperature range of the DOT device 100, and are attached to different sidewalls of the CCRs. In the embodiment of FIG. 1, at least two different CCRs 110 and 120 are employed, one CCR 120 with a low index medium (indicated as n=1). This may be a conventional air gap for the low index medium. Also provided is at least one other CCR 110 with a high index medium (indicated as n>1). The high index CCR 110 with n=1.5 provides high acceptance angles, up to +/−60° for example, for the DOT device 100. In the embodiment of FIG. 1, a conventional mirror surface may be placed on the remaining sidewall 114 and 124 of each of the CCRs 110 and 120, respectively.

In certain embodiments, a high contrast modulator is required for situations where the signal-to-noise ratios at the optical receiver is low. Conventional MQW modulators fabricated of InGaAs/InAlAs have relatively low contrast ratios of about −2:1 within the typical wide range of operating temperatures. To improve the contrast ratio of the CCRs 110 and 120, Fabry-Perot cavity enhancement may be utilized.

Tunable Cavity Fabry-Perot MQW Modulator

FIGS. 2A-2C

Figure 2A:
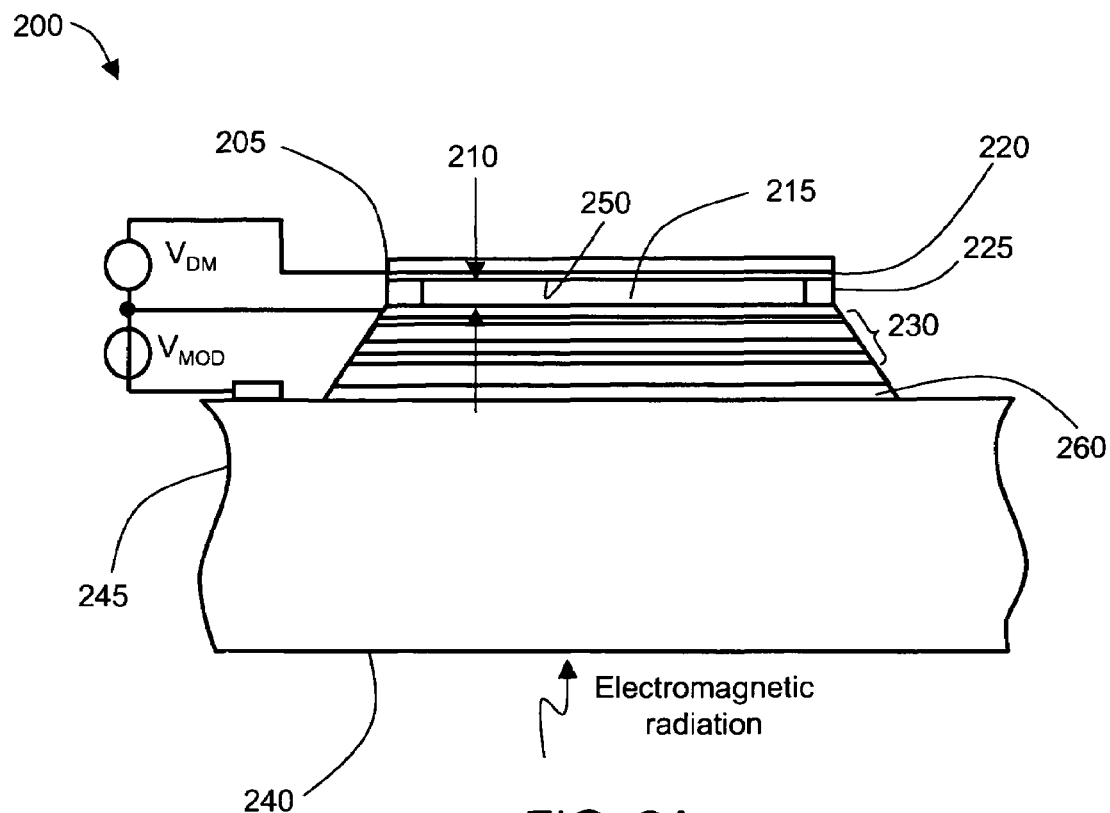
FIG. 2A shows a simplified side view illustration of one possible example of a tunable cavity Fabry-Perot MQW modulator, utilized in certain embodiments of the dynamic optical tag device.

FIG. 2a Shows a Simplified Side View Illustration of One possible example of a tunable cavity Fabry-Perot MQW modulator 200, utilized in some embodiments of the DOT device 100. Thus, the tunable cavity Fabry-Perot MQW or TCFP-MQW modulator 200 may be utilized for the modulators MOD-A and MOD-B. A TCFP-MQW modulator 200 typically has a higher contrast ratio than conventional MQWs. By inserting the MQW structure in a Fabry-Perot cavity, contrast ratio enhancement is achieved throughout a wide temperature range of operation >100° C. The tunable cavity Fabry-Perot MQW modulator can provide high modulation contrast ratios at a wide range of acceptance angles by proper tuning of the cavity length 210.

In the embodiment of FIG. 2A, the MQW modulator with a distributed Bragg reflector 260 is shown fabricated on InP substrate material, and the tunable micromirror array 220 is shown fabricated on a silicon substrate 205. The InP substrate 245 is transparent to the incident and retro-reflected (and modulated) beams. The outer surface 240 of the InP substrate 245, can be anti-reflective coated for enhanced performance. The inner surface 250 of the silicon micromirrors of the micromirror array 220 are coated with a totally reflecting thin film, such as gold (Au).

Figures 2B, 2C:
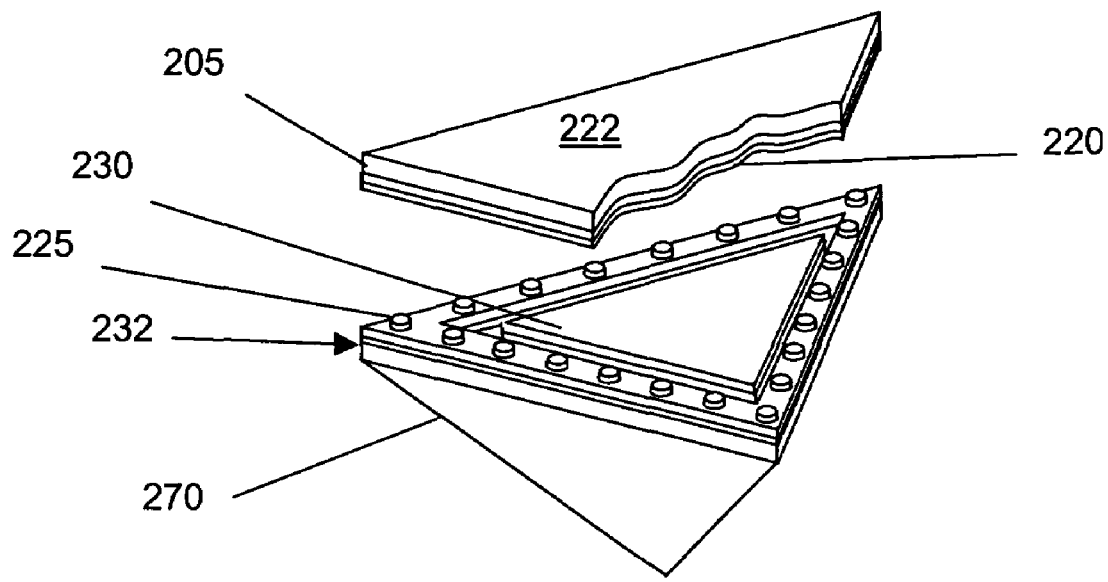
FIG. 2B shows an exploded view of a possible embodiment of a tunable cavity Fabry-Perot MQW modulator dynamic optical tag device.
FIG. 2C shows a cut away side view of the tunable cavity Fabry-Perot MQW modulator dynamic optical tag device of FIG. 2B.

Turning to FIGS. 2B and 2C, shown in FIG. 2B is an exploded view of a possible embodiment of a tunable cavity Fabry-Perot MQW modulator DOT 201. FIG. 2C is a cut away side view of the tunable cavity Fabry-Perot MQW modulator DOT 201 of FIG. 2B. After the MQW modulator 230 and the piston mirror array 220 are fabricated, the mirror array 220 is joined with the MQW modulator piece 230 through thermo-compression bonding of the electroplated gold posts 225 formed on the MQW modulator piece 232, to gold pads 227 (shown in FIG. 2C) formed on the mirror array piece 222. Optional side supports 228 and 229 may be formed on the Si substrate 205 and InP substrate 229, respectively, to facilitate spacing of the mirror array piece 222 and the MQW modulator piece 232. Commercially available piston mirror array actuators 220 such as by Boston Micromachines, Boston Mass. may be utilized for fabricating this device. This assembly approach can provide a uniform air gap 215 of path length 210, both shown in FIG. 2A, between the MQW modulator 230 and the micromirror array 220. In this way, the tunable cavity Fabry-Perot MQW modulator DOT 201 may be secured to a side of the CCR 270.

Referring again to FIGS. 1-2C, one reason for choosing a pair of CCRs, i.e. an n=1 CCR 120, together with the higher index CCR 110, in the case of the TCFP-MQW modulators, is to avoid total internal reflection in the air gap 250 (at the semiconductor/air interface) where the tunable micromirror array 220 is located. The total internal reflection occurs at certain incident angles to the high index CCR 110. For example, for a CCR with n=1.5, the incident light angles to the CCR 110 of less than +/−10° result in total internal reflection, while higher incident angles are free of total internal reflection when a TCFP-MQW modulator 200 is used for MOD-A or MOD-B. In this example, incident light angles between 0 and +/30° can be retromodulated from the n=1 CCR 120, while the n=1.5 CCR 110 is used to retromodulate light incident between +/−30° and +/−60°, both with high contrast ratios. For either range of incident angles, one or both of the TCFP-MQW modulators, MOD-A and MOD-B, in the non-contributing CCR 110 or 120, will be turned off by proper tuning of the voltage, and/or the cavity air gap 215 using the tunable micromirror array 220, in order to maintain the high contrast ratios.

Another degree of freedom in further reducing any residual reflection from the non-contributing CCR 110 or 120 is to statically position every other micromirror comprising the tunable piston mirror in the off-state TCFP-MQW modulators by $\lambda/4$, forming a static phase grating, as shown in FIGS. 5A & 5B. This will result in further diffractive scattering of the residual off-state reflection out of the retro path, further improving the contrast ratio.

A hand-off from the contributing, to the non-contributing CCR 110 or 120, may be achieved by monitoring the photocurrent in the TCFP-MQW in the two CCRs 110 and 120, as the cavity is tuned. No change of photocurrent with cavity thickness is an indication of total internal reflection. When the voltage is changed and there is no corresponding change in photocurrent, it can be assumed that there is total internal reflection. Thus, when there is no change in the current through the power supply $V_{MOD}$ in response to dithering of the voltage supplied by the power supply $V_{MOD}$, total internal reflection is indicated. If there is total internal reflection, i.e. there is no modulation by one of the CCRs 110 or 120, it can be turned off or otherwise idled, while the other of the CCRs 110 or 120 is used for modulating the incoming signal. This selection mechanism, as well as selection of the proper modulator MOD-A or MOD-B for operation, may be under the control of a control circuitry (not shown) such as a microprocessor, microcontroller, component circuitry, etc. Other means of detecting and/or sensing for selecting and controlling a CCR for operation are possible.

For each contributing CCR 110 and 120, there are two TCFP-MQW modulators, a MOD-A and a MOD-B, as shown in FIG. 1. The entire temperature range of operation is split into two parts, TEMP1 and TEMP2, as shown in Table 1 below.

TABLE 1

|       | TEMP1      | TEMP2      |
|-------|------------|------------|
| MOD-A | MODULATING | MIRROR     |
| MOD-B | MIRROR     | MODULATING |

Each of the two MQW modulators is designed to cover one temperature range. For example, for temperatures within TEMP1, such as a high temperature range, MOD-A will function as a modulator, and MOD-B will function as a high reflectivity mirror. For MOD-A in this example, high contrast ratios throughout the range of acceptance angles of the CCR is achieved by tuning the air gap piston micromirror array and monitoring the MQW photocurrent. Maximizing this photocurrent results in minimized off-state device reflectivity at a given incident angle, and hence maximum modulator reflection contrast. For MOD-B in this example, maximum reflection (90-95%) is achieved by applying a zero-bias to the modulator for all angles within the acceptance angles of the CCR 110 or 120. The roles of MOD-A and MOD-B are reversed for TEMP2, a low temperature range in this example. Thus, using both the air gap and high-index CCRs with the TCFP-MQW modulator allows the DOT device to meet its most stringent requirements, i.e. very high acceptance angle of +/−60°, and very high temperature range of >100° C., with sufficiently high contrast ratio to cover cases where the signal-to-noise ratios at the optical receiver are very low.

Also shown in FIG. 1 is an optional second high index medium CCR 130. This may be included to ensure that the incident light always hits the modulating surface of either MOD-A or MOD-B, in addition to reflecting off of the mirror surface 134, and the non-modulating surface MOD-A or MOD-B, before exiting the reflection cavity 112 or 132 of CCR 110 or 130, respectively. In some instances, with only one high index medium CCR 110 or 130, the angle of incidence can be such that it is possible to have light pass into and out of a CCR 110 or 130 without hitting the modulating surface MOD-A or MOD-B. The CCR 130 has MOD-A and MOD-B on different sides of the CCR 130 than the CCR 110. As such, the modulators MOD-A and MOD-B on CCR 110 and CCR 130 are oriented such that modulators configured to operate in the same temperature range have different orientations. For example, as shown in FIG. 1, the arrangement of MOD-A and MOD-B on CCR 130 is a mirror image configuration with respect to the arrangement of MOD-A and MOD-B on CCR 110.

As discussed above with reference to FIG. 1, the high index CCR 110 with n=1.5 provides high acceptance angles, up to +/−60°. Moreover, it is possible to achieve higher acceptance angles using a higher index medium, greater than n=1.5, in the CCR 110, or, in the CCR 130, if desired. The values indicated for the medium index n shown herein are for example purposes, other values are possible.

Example DOT with a High Index CCR and MQWs for Three Temperature Ranges

Figure 3A:
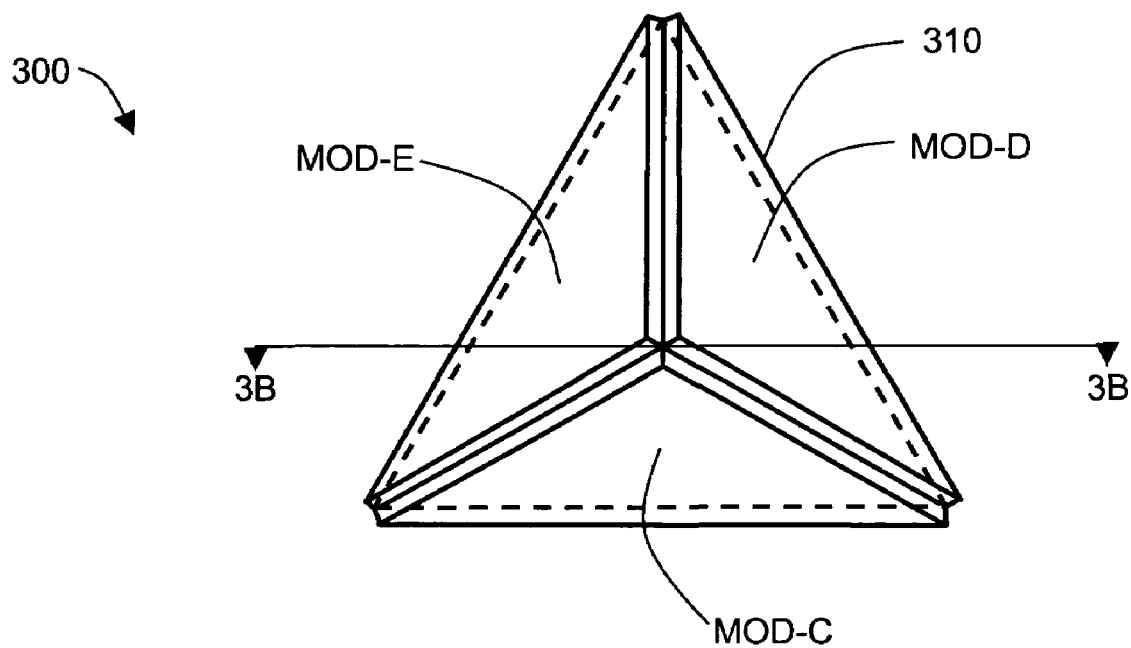
FIG. 3A is an isometric view of a back side of an embodiment of a corner cube retroreflector of a dynamic optical tag device having an MQW modulator on each of its three sides.
Figure 3B:
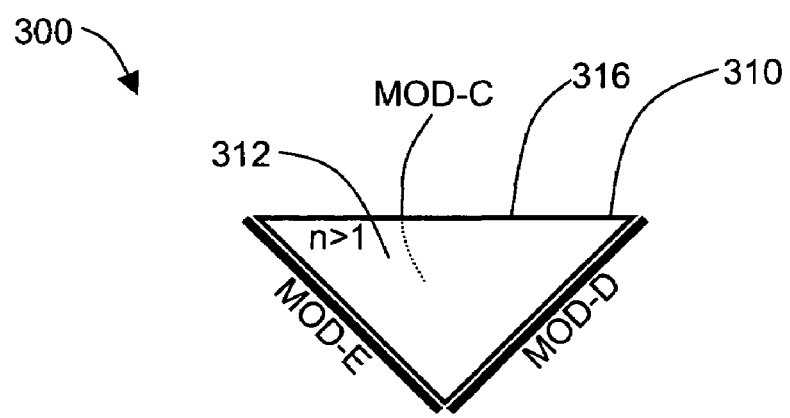
FIG. 3B is a side view of the corner cube retroreflector along the 3B-3B line of FIG. 3A.

FIGS. 3a and 3b

In another MQW modulator DOT embodiment 300, shown in FIGS. 3A and 3B, the entire temperature range is divided into three parts, and three conventional MQW modulators, indicated as MOD-C, MOD-D, and MOD-E, are attached, e.g. optically bonded, to the three faces of one high index (n>1) CCR 310. Each of the conventional MQW modulators MOD-C, MOD-D, and MOD-E is optimized for operations within one temperature range. FIG. 3A is an isometric view of a back side of a CCR 310. FIG. 3B is a side view along the 3B-3B line of FIG. 3A. Thus, the entire temperature range of operation may be split into three parts, TEMP I, TEMP II, and TEMP III, as shown in Table 2 below.

|       | TEMP I     | TEMP II    | TEMP III   |
|-------|------------|------------|------------|
| MOD-C | MODULATING | MIRROR     | MIRROR     |
| MOD-D | MIRROR     | MODULATING | MIRROR     |
| MOD-E | MIRROR     | MIRROR     | MODULATING |

Since the CCR is a solid with 3 modulators bonded to its rear faces, the retro-modulator is physically robust and its optical alignment is always maintained. The exposed surface 316 can be anti-reflection coated to minimize spurious reflective losses. Since there is no air gap in the structure of these MQW modulators, total internal reflection does not exist, so is not an issue. As an example, using a medium 312 within the CCR 310 with index of n=2.6, incident light angles between 0 and +/−60° are refracted inward (collapsed) to within +/−20° with respect to the CCR front surface 316 normal. This range of angles is then within the retroreflection acceptance angle of the CCR 310. Similar to the TCFP-MQW modulator approach described above, for each temperature zone, one of the MQW modulators will function as modulator, while the other two MQW devices serve as a passive mirror by application of zero-bias voltage. Although this MQW modulator-based DOT approach is simpler to implement, in some embodiments it has the disadvantage of having low contrast ratios, in particular at some temperatures within the wide required range, even when optimizing each modulator MOD-C, MOD-D, and MOD-E for its intended temperature range.

For either MQW modulator DOT approach discussed above, since the devices are attached to the sidewalls of a CCR, their incident angle is predominantly non-normal. Thus, the effect of the polarization of the incident light on MQW absorption characteristics has to be considered. The polarization dependence of MQW modulators has been extensively studied. In some embodiments, such as an InGaAs/InAlAs MQW structure, the experimental absorption spectra as a function of both s and p-polarizations indicates that there is very little polarization sensitivity for the electroabsorption as a function of modulator voltage for the s and p-polarization states. Thus, in some embodiments polarization insensitivity may be achieved by the introduction of compressive strain into the InAlAs barrier layer against a tensile strained well layer. By the proper selection of the strain, MQW structures with good material quality can be grown. The other structure in the TCFP-MQW modulator that can be polarization sensitive is the front DBR mirror of the Fabry-Perot cavity. For example, the simulated reflectivity spectrum of an 11 pair InAlAs/InAlGaAs DBR, lattice matched to InP, for s and p-polarized incident light at a calculated nominal incident angle of 14 degrees inside the MQW cavity is 53% and 60% for p and s-polarization, respectively, at 1550 nm wavelength. Simulation results has shown that TCFP-MQW that contrast ratios of more than 10 are readily achieved with this variation in front mirror reflectivity, if the Fabry-Perot cavity is properly tuned.

Example DOT Using High and Low Index CCRs

FIGS. 4, 5A, and 5B

FIG. 4 shows a cut away side view illustrating one possible embodiment of a Dot Device 400. In the Dot Device 400 of FIG. 4, a dynamic phase diffraction grating or DDG modulator 415 is used. Shown in FIGS. 5A and 5B is one embodiment of the modulation mechanisms in which every other grating mirror 417 of the DDG 415b is displaced by a quarter-wave length in the off-state (shown in FIG. 5B) to diffract the incoming interrogation light 450b. An example of a dynamic phase diffraction grating is shown in U.S. patent application Ser. No. 10/661,028, by Pepper, et al., filed Sep. 11, 2003, entitled OPTICAL RETRO-REFLECTIVE APPARATUS WITH MODULATION CAPABILITY, published Apr. 22, 2004, Pub. No. US 2004/0075880 A1, herein incorporated by reference.

In the embodiment of FIG. 4, a combination of high and low index CCRs, 410 and 420 are used. This results in a DOT device 400 with a higher acceptance angle than a traditional air-filled device, while maintaining a high modulation contrast ratio. The DOT device 400 also has a faster response time, higher efficiency and higher acceptance angle over conventional MEMs CCR modulators, where one of the CCR surfaces is dynamically tilted.

Thus, as with the MQW-based approaches discussed above, in some embodiments, the combination of a DDG modulator with high and low index CCRs, 410 and 420, will result in a high acceptance angle of +/−60° DOT device. Two CRRs, 410 and 420, are used to avoid total internal reflection at interface between the semiconductor on which the grating is fabricated and the air in the DDG, similar to the TCFP-MQW modulators discussed above.

In some embodiments, the DDG modulator 415 is essentially a dynamic square-wave phase (or step index) grating. By dynamically displacing every other grating mirror 417b by $\lambda/4$ as shown in FIG. 5B, the phase difference between successive grating elements $\Delta\phi=\pi/2$, with the $0^{th}$ order diffraction being eliminated, and about 81% of the incident optical energy is diffracted into the +/−$1^{st}$ orders. When the grating mirrors 417a are all flush with each other (zero-bias case) as shown in FIG. 5A, close to 95% of the incident light 450a is specularly reflected. Thus, by placing this device on the sidewall of the CCR 410 and/or 420, the light 450a of the interrogating beam is retroreflected with high efficiency when no voltage is applied to the grating mirror 417a, and is diffracted out of the retro path when a sufficient voltage is applied to result in $\lambda/4$ deflection. The achieved contrast ratio will be high since the diffraction angle of the light in the +/−$1^{st}$ orders ($\lambda/d_{GRTING}$) is at least 1 order of magnitude larger than the diffraction angle from individual CCRs ($\lambda/d_{CCR}$). This is because the grating period is typically 100 micrometers or less, while the CCRs typically can have dimensions of a few millimeters or more.

Thus, in various embodiments, the DOT 400 can provide high contrast ratios concurrent with a wide temperature range of operation, and may be manufactured at very low cost. Although some DOT embodiments employing a DDG have lower data modulation speed as compared to the MQW modulator-based DOT, by proper design of the grating mirror size and configuration, modulation rates up to 1 Mb/s could be achieved. Thus, various embodiments of the DOT which include a DDG modulator with high and low index CCRs, 410 and 420, can provide a low cost DOT with moderate data rate and high acceptance angle.

In various embodiments, the retroreflecting dynamic optical tag device may provide high field-of-view, high data rate, and/or an extended temperature range of operation using a combination of high performance optical modulators which are attached to different faces of high and low index CCRs. A variety of optical modulators can be used in the dynamic optical tag device described herein, each resulting in its own unique advantages. For example, MQW modulators for very high data rates, and dynamic diffraction gratings for high modulation contrast ratios can be used in the DOT device discussed herein. Other modulators are possible.

Enhanced temperature range of operation may be achieved via the use of two or three MQW modulators attached to corresponding side faces, each MQW modulator with a different excitation feature, and each covering a different temperature range. For each temperature range of operation, one of the modulators acts as a modulator, while the other modulators perform as a simple high reflectivity mirror.

In various embodiments, a compact DOT device with high performance characteristics, such as high data rate, high modulation contrast ratio, high field-of-view, and an extended temperature range of operation is possible. Because of the high field-of-view of the high index CCRs, fewer CCRs are required as compared conventional retroreflecting devices, allowing for a more compact DOT device. Furthermore, the combination of high and low index corner cube retroreflectors with attached MQW modulators, or with attached dynamic diffraction grating modulators, allows for a compact DOT device. In the case of the TCFP-MQW modulator the TCFP-MQW serves as a high-speed electro-absorption modulator. It also serves as an efficient optical detector for handshaking operations in an optical communication link with concerns of third-party interception and/or detection, and, additionally, for smart-pixel functionality. In the case of the conventional MQW modulator, a high-index CCR with MQW modulators bonded to all three reflective faces, can satisfy high field-of-view and operating temperature range in a single DOT device.

Some DOT embodiments described herein can have both military as well as commercial applications. For example, a small and compact dynamic optical tag device that has a simultaneous high FOV and a high operating temperature range would be ideally suited for military applications. Various embodiments of the high performance DOT devices described herein can be made inexpensive and in a small form factor such as they can be attached to military vehicle, carried by soldiers, or connected to a variety of sensors in a battlefield environment. Various airborne or terrestrial optical interrogators can then scan the field in order to receive mission-critical data from the DOT devices attached to these sources of information. The high field-of-view characteristics of various embodiments of the DOT devices described herein allow retroreflection back to the optical interrogators for data reception while they are positioned in a wide range of orientations with respect to the interrogator. This, together with their wide range of operating temperatures and functionality independent of polarization, make these dynamic optical tags very suitable for battlefield use.

The proposed DOT concepts can also have applications in novel identify-friend-or-foe or IFF functions. For example, a DOT device mounted on a friendly platform can provide diversional information during the terminal phase of unintentional incoming friendly missiles. Assuming that a missile (e.g., a Tomahawk) is equipped with a laser interrogator, the DOT system would represent a relatively small additional cost to a cruise missile, coupled with the benefit of minimizing friendly fire and collateral damage. This scenario can provide a much-needed solution to an on-going historical battlefield fratricide problem.

Beyond its various military applications, there are also commercial uses for various embodiments of a low cost dynamic optical tag. Examples of these applications include very low cost auto-tracking optical tags that can be installed in cars for relaying various operational or service related information using optical interrogators even in the face of vibrations and beam wander. Also, the optical tags can be installed in various locations within a factory environment forming high data rate optical wireless links for the transfer of manufacturing-critical information between various stations. Many other applications are possible in the military and commercial environments.

Figure 6:
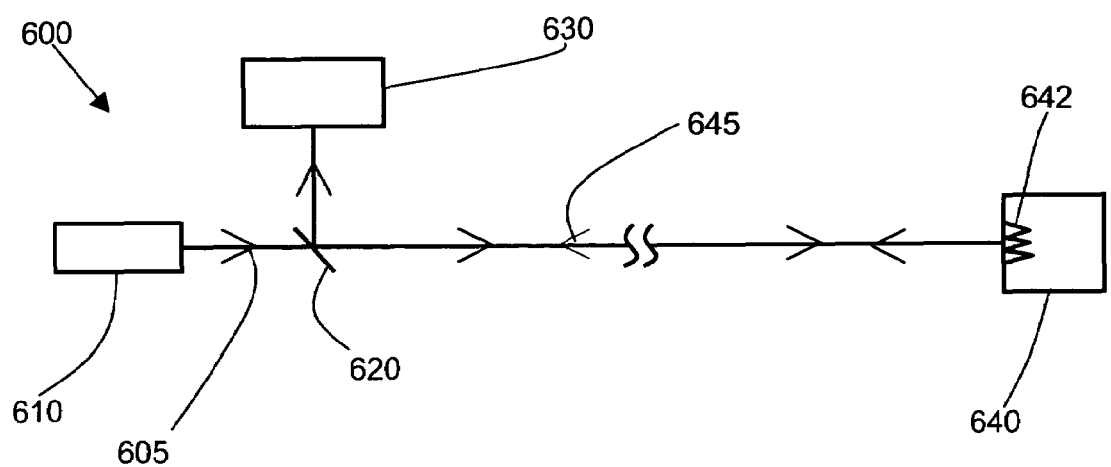
FIG. 6 shows a simplified functional block diagram of an example dynamic optical tag communication system.

FIG. 6 shows a simplified functional block diagram of an example dynamic optical tag communication system 600. In this embodiment, an interrogation signal 605 is transmit from a source 610, such as a laser, to the dynamic optical tag modulator 640. The dynamic optical tag modulator 640 is retroreflected and diverted to a receiver 630 by a mirror 620. Thus, the interrogation signal 605 is modulated by data input with the dynamic optical tag modulator 640 to provide a modulated retroreflected signal 645. The mirror 620 diverts the modulated retroreflected signal 645 toward the receiver 630 where data is recovered from the modulated signal. Although illustrated with three corner cube reflectors 642, this is not required. The dynamic optical tag modulator 640 may include any of the dynamic optical tag embodiments discussed herein.

Having described this invention in connection with a number of embodiments, modification will now certainly suggest itself to those skilled in the art. As such, the invention is not limited to the disclosed embodiments, except as required by the appended claims.

What is claimed is:

1. A dynamic optical tag communication comprising a plurality of corner cube retroreflectors comprising:
    a) a first corner cube retroreflector comprising three sides forming a cavity, the first corner cube retroreflector comprising:
        (i) a first side comprising a modulator configured to modulate in a first temperature range;
        (ii) a second side comprising a modulator configured to modulate in a second temperature range; and
        (iii) a low index medium within the cavity;
    b) a second corner cube retroreflector comprising three sides forming a cavity comprising:
        (i) a first side comprising a modulator configured to modulate in the first temperature range;
        (ii) a second side comprising a modulator configured to modulate in the second temperature range; and
        (iii) a high index medium within the cavity of the second corner cube retroreflector.

2. The dynamic optical tag communication system of claim 1 further comprising a third corner cube retroreflector having three sides forming a cavity, the third corner cube retroreflector comprising:
    a) a first side comprising a modulator configured to modulate in the first temperature range;
    b) a second side comprising a modulator configured to modulate in the second temperature range; and
    c) a high index medium within the cavity of the third corner cube retroreflector.

3. The dynamic optical tag communication system of claim 2, wherein the first, second, and third corner cube retroreflectors each comprise at least two tunable cavity Fabry-Perot multiple quantum well modulators.

4. The dynamic optical tag communication system of claim 3, wherein the first corner cube retroreflector and the third corner cube retroreflector are oriented such that modulators configured to operate in the same temperature range are located on respective sides of the first and the third corner cube reflectors having different orientations.

5. The dynamic optical tag communication system of claim 3, wherein the low index medium comprises air.

6. The dynamic optical tag communication system of claim 3, wherein the high index medium comprises an index of at least about one and one half.

7. The dynamic optical tag communication system of claim 3 further comprising:
    a) wherein the modulator of the first side of the first corner cube retroreflector is configured as a reflector when the first modulator is not within the first temperature range, and the modulator of the second side of the first corner cube retroreflector is configured as a reflector when the second modulator is not within the second temperature range;
    b) wherein the modulator of the first side of the second corner cube retroreflector is configured as a reflector when the second modulator is not within the second temperature range, and the modulator of the second side of the second corner cube retroreflector is configured as a reflector when the modulator is not within the second temperature range; and
    c) wherein the modulator of the first side of the third corner cube retroreflector is configured as a reflector when the third modulator is not within the third temperature range, and the modulator of the second side of the third corner cube retroreflector is configured as a reflector when the modulator is not within the third temperature range.

8. The dynamic optical tag communication system of claim 3 further comprising control circuitry configured to select a modulator for operation based on at least one of: (a) detection of a photocurrent in response to a modulating voltage, or (b) an operating temperature.

9. The dynamic optical tag communication system of claim 3, wherein the first, the second, and the third corner cube retroreflectors each comprise a mirror on a third side.

10. The dynamic optical tag communication system of claim 3 further comprising:
    a) an interrogator source;
    b) a receiver;
    c) a mirror positioned to divert a modulated retroreflected signal from the dynamic optical tag to the receiver.

11. The dynamic optical tag communication system of claim 1, wherein the first and the second corner cube retroreflectors each comprise as least two tunable cavity Fabry-Perot multiple quantum well modulators.

12. The dynamic optical tag communication system of claim 11, wherein the first and the second corner cube retroreflectors each comprise a mirror on a third side.

13. The dynamic optical tag communication system of claim 11, wherein the low index medium comprises and index of about one.

14. The dynamic optical tag communication system of claim 11 further comprising:
    a) wherein the modulator of the first side of the first corner cube retroreflector is configured as a reflector when the first modulator is not within the first temperature range, and wherein the modulator of the second side of the first corner cube retroreflector is configured as a reflector when the modulator is not within the second temperature range, and b) wherein the modulator of the first side of the second corner cube retroreflector is configured as a reflector when the second modulator is not within the second temperature range, and wherein the modulator of the second side of the second corner cube retroreflector is configured as a reflector when the modulator is not within the second temperature range.

15. The dynamic optical tag communication system of claim 11 further comprising control circuitry configured to select a modulator for operation based on at least one of: (a) detection of a photocurrent in response to a modulating voltage, or (b) an operating temperature.

16. The dynamic optical tag communication system of claim 11 further comprising:

a) an interrogator source;

b) a receiver;

c) a mirror positioned to divert a modulated retroreflected signal from the dynamic optical tag to the receiver.

* * * * *